United States Patent
Schultz

[11] 3,922,065
[45] Nov. 25, 1975

[54] CUBE-CORNER RETRO-REFLECTIVE ARTICLE

[75] Inventor: Thomas E. Schultz, Village of Roseville, Minn.

[73] Assignee: Minnesota Mining and Manufacturing Company, St. Paul, Minn.

[22] Filed: Feb. 19, 1971

[21] Appl. No.: 117,035

Related U.S. Application Data

[60] Continuation of Ser. No. 749,239, May 31, 1968, abandoned, which is a division of Ser. No. 593,948, Nov. 14, 1966, Pat. No. 3,417,959.

[52] U.S. Cl. .............................. 350/103; 350/67
[51] Int. Cl.² .......................................... G02B 5/12
[58] Field of Search .............................. 350/97 109, 350/67; 94/1.5

[56] References Cited
UNITED STATES PATENTS
3,485,148  12/1969  Heenan ............................... 350/67

FOREIGN PATENTS OR APPLICATIONS
987,243  3/1965  United Kingdom .................. 350/67

*Primary Examiner*—David H. Rubin
*Attorney, Agent, or Firm*—Alexander, Sell, Steldt & DeLaHunt

[57] ABSTRACT

A retro-reflective monolithic article formed of transparent material and having the array of cube-corner retro-reflective units on the rear face divided into cells. The walls defining the cells are formed integrally and extend directionally along the shortest path formed by dihedral edges between adjacent apexes of the retro-reflective units bordering each cell.

7 Claims, 21 Drawing Figures

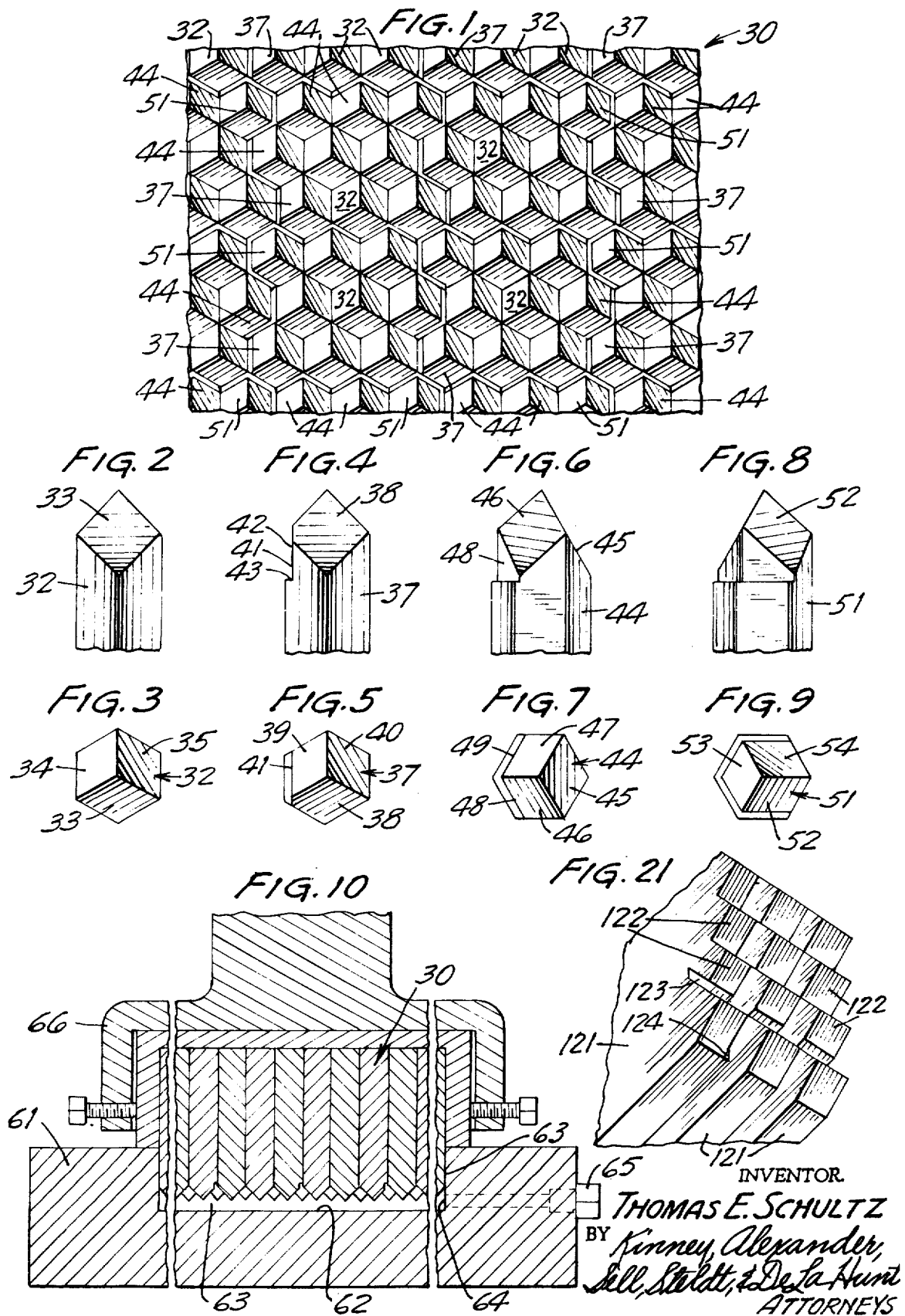

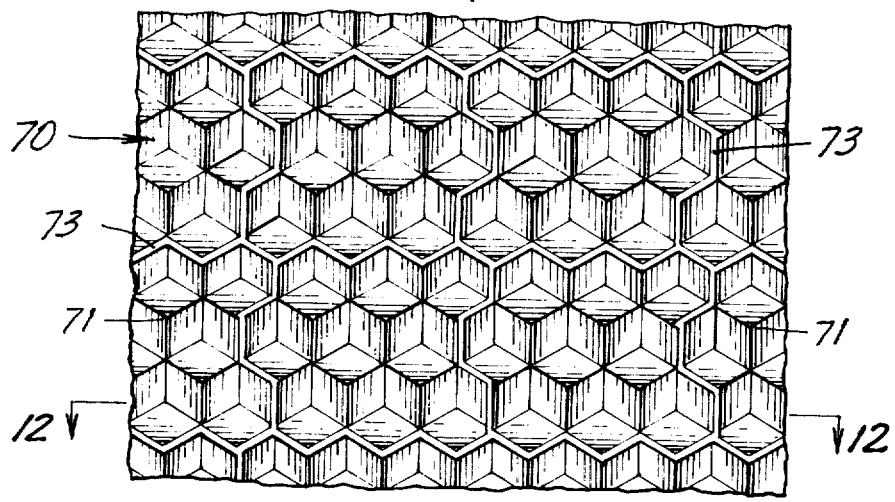
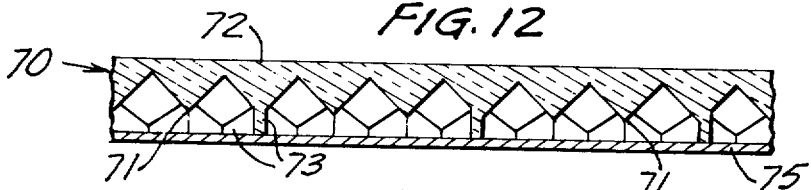
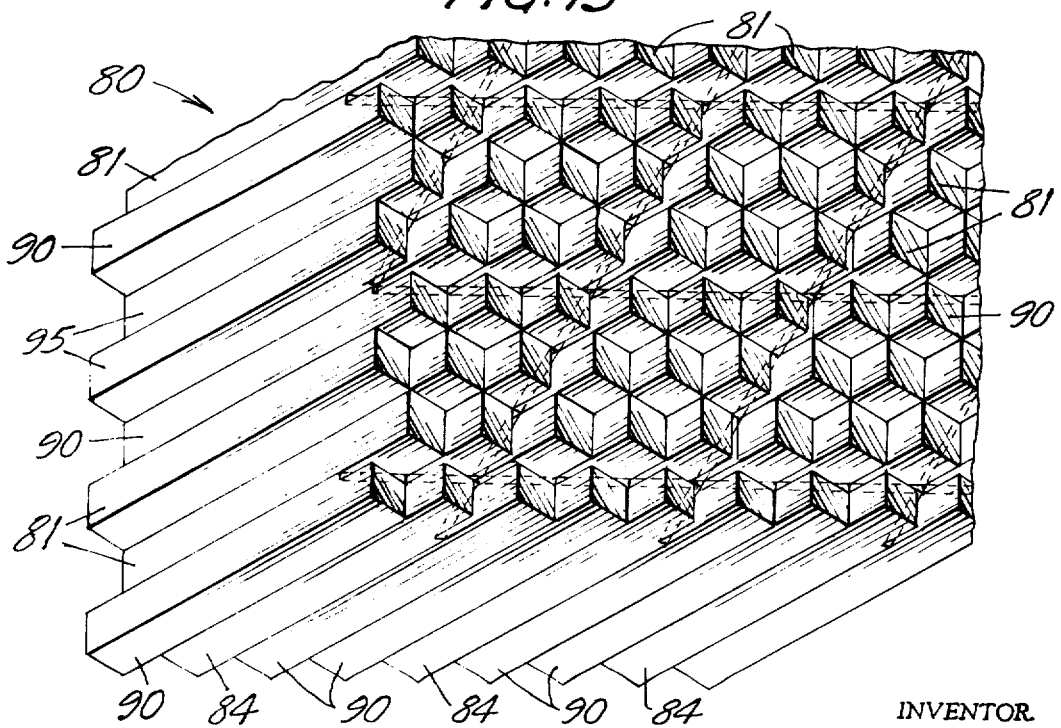

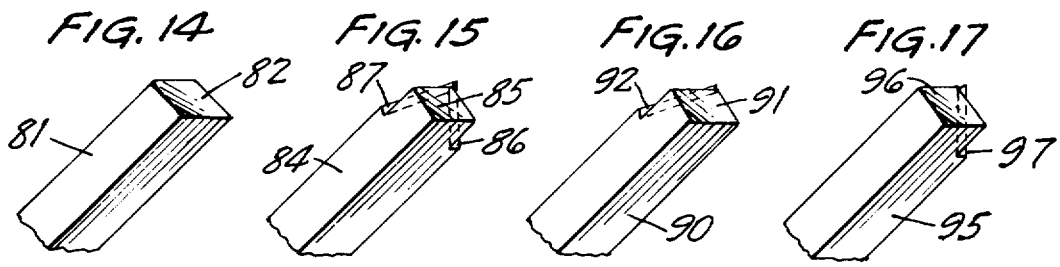
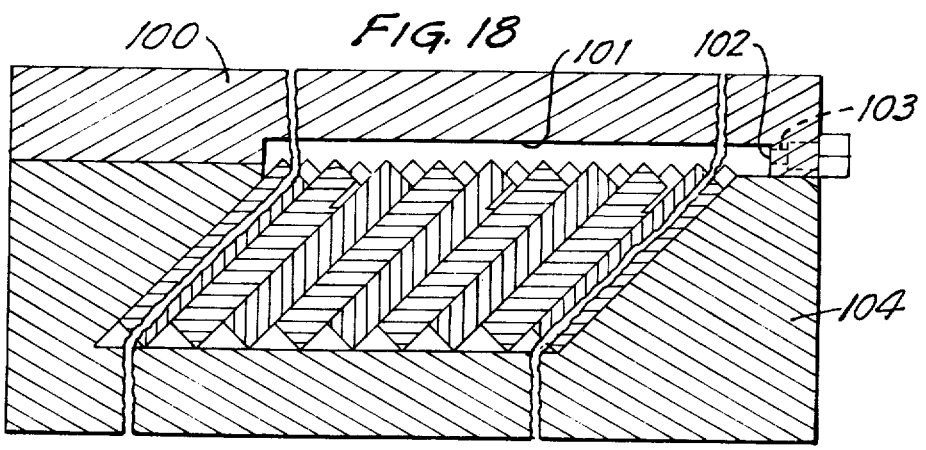
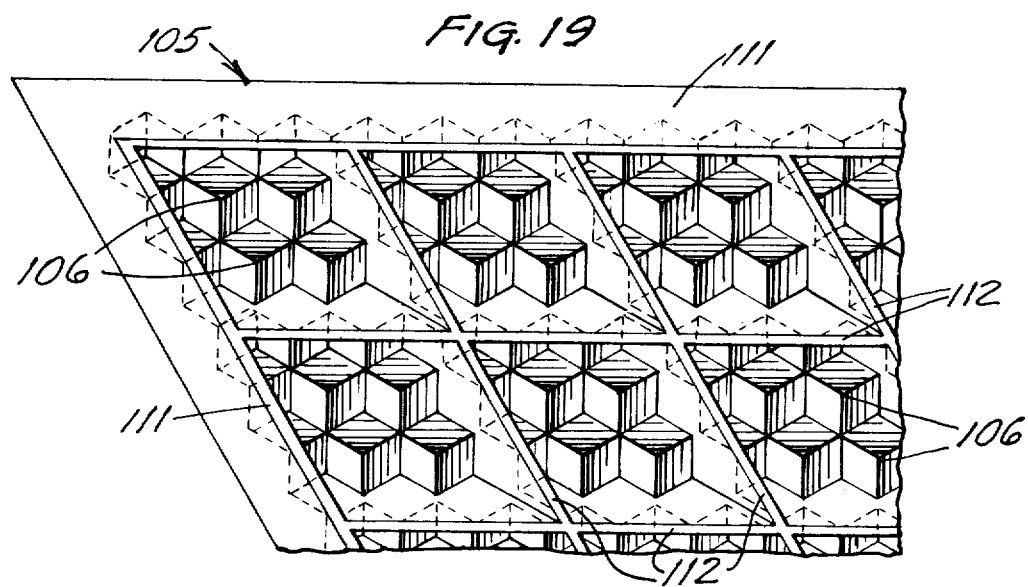
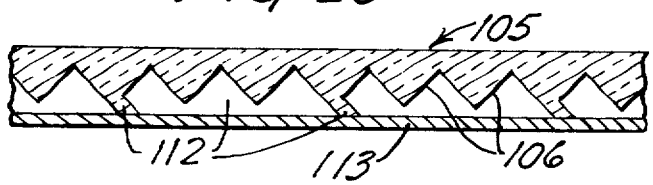

CUBE-CORNER RETRO-REFLECTIVE ARTICLE

CROSS REFERENCES TO RELATED APPLICATIONS

This application is a continuation of application Ser. No. 749,239, filed May 31, 1968, now abandoned, which is a divisional application of Ser. No. 593,948, filed Nov. 14, 1966, now U.S. Pat. No. 3,417,959.

This invention relates to a retro-reflective article and to a die for forming the same.

In one aspect this invention relates to an improvement in retro-reflective plate-like articles having cube-corner retro-reflective units embossed on one surface thereof with the articles divided into cellular sections by septa embossed on the same surface as and separating numbers of said units. The septa are formed to connect adjacent apexes of the units and extend directionally along the dihedral edges forming the shortest path between said apexes. The free edges of the septa are available for bonding a backing sheet to the articles to form retro-reflective sheet material having a long useful life. The articles and backing sheet in combination define a plurality of separate hermetically sealed cells.

The retro-reflecting article of the present invention affords increased brilliance for a cellular cube-corner retro-reflective sheet by having the septa defining the cells in the article extend directionally along edges of the facets forming the cube-corner units. This structure has an advantage in that only the retro-reflectivity of the very corner or apex and the reflectivity of two or three dihedral edge portions of the cube-corner, from which extend a septum, are destroyed and not the retro-reflectivity of the entire cube-corner since portions of the side walls of said units are still present which define the greatest reflective area of the unit. The amount of retro-reflection actually lost is a fraction of a cube-corner unit, not an entire unit as is the case if the septa are formed at random across the face of a plate embossed to form cube-corner units on a surface.

The above and further objects and advantages of the present invention will be more readily apparent after reading the following description which refers to the accompanying drawing wherein:

FIG. 1 is an enlarged fragmentary view of a face of a die member formed to provide an article in accordance with the present invention from one type of member;

FIG. 2 and FIG. 3 are respectively a side view and an end view of one type of pin used in the die of FIG. 1;

FIGS. 4 and 5 are respectively a side view and an end view of a second type of pin;

FIGS. 6 and 7 are respectively a side view and an end view of a third type of pin;

FIGS. 8 and 9 are respectively a side view and an end view of a fourth type of pin used in the die of FIG. 1;

FIG. 10 is a fragmentary sectional view of a mold showing the die of FIG. 1 in the movable member and in cross-section;

FIG. 11 is an enlarged fragmentary rear view of the product formed by the die of FIGS. 1 and 10;

FIG. 12 is an enlarged fragmentary vertical section showing the final retro-reflective sheet product;

FIG. 13 is an enlarged fragmentary view of a second embodiment showing a face of a die formed from another embodiment of the members;

FIG. 14 is a perspective view of one type of pin used in forming the die of FIG. 13;

FIG. 15 is a perspective view of a second type of pin used in the die of FIG. 13;

FIG. 16 is a perspective view of a third type of pin used in forming the die of FIG. 13;

FIG. 17 is a perspective view of a fourth type of pin used in forming the die of FIG. 13;

FIG. 18 is an enlarged fragmentary sectional view of a press showing a die constructed in accordance with FIG. 13;

FIG. 19 is an enlarged fragmentary rear view of the product formed by the mold of FIG. 18;

FIG. 20 is an enlarged fragmentary vertical section showing the final retro-reflective sheet material formed in accordance with the present invention from the die of FIGS. 13 and 18; and FIG. 21 is a fragmentary perspective view of another embodiment of the members for forming a die to mold articles in accordance with the present invention.

Referring now to FIG. 1 of the drawing, a portion of the face of a die, generally designated by the reference numeral 30, is illustrated. This die 30 is formed of members nested together to form an array of cube-corner trihedrons. These trihedrons do not correspond to the portion of a cube divided by a diagonal plane, but consist of three full adjacent sides of a cube. The array is produced by nesting together a plurality of members formed at one end with three generally square plane surfaces or facets joined at right angles. The members in this group are pins which have a regular hexagon cross-section. FIGS. 2 and 3 show a typical pin 32 for forming this die, which pin or hexagonal bar is made of a convenient length and at one end is pointed by cutting three plane square surfaces 33, 34 and 35 which are perpendicular to each other, and when the pins are grouped parallelly with a different surface on each of three pins disposed in mating engagement, form a depression which is also a cube corner. Additional elements placed in a similar assembled relationship therewith produce an array of cube-corner depressions which upon molding produce cube-corner retro-reflective units. The die forms an article which has not only the retro-reflective units but also wall members or septa which divide the units into sections or cells. The septa are formed in a manner to minimize the loss in retro-reflectivity and to afford free end surfaces for bonding a backing sheet to the article.

In FIG. 1 a plurality of the pins 32 are grouped to form cube-corner depressions, and these pins are grouped with three other preformed types of pins to form a die for molding an article in accordance with the present invention.

FIGS. 4 and 5 illustrate the second pin used in forming the die for molding an article of the present invention. This pin 37 has a cross-section which is a regular hexagon and is made of a convenient length with three plane surfaces 38, 39 and 40 formed at one end thereof, which surfaces are perpendicular to each other, forming a trihedron on the end of the pin. Pin 37 however has a portion of one side wall cut away adjacent the end of the pin to form a notch 41. The notch 41 extends parallel along one side wall of the pin 37 and thus along one edge of the facet 39, reducing its area so it would no longer be a square, and the wall 42 of the notch would also truncate a corner of the facet 38, as shown in FIG. 4. The wall 42 is generally parallel with the side wall of the pin, but sufficient draft is permitted for release of an article formed thereby from a mold. The bottom 43 of the notch 41 is perpendicular to the side wall of the pin. The pins 37 are positioned adjacent corners of each of the sections of the die 30, forming a cell. This will be described in greater detail hereinafter.

FIGS. 6 and 7 show a third pin wherein the pin 44 is again a regular hexagon of a convenient length and pointed at one end by three perpendicular surfaces 45, 46, and 47. This pin differs from the pins 32 and 37 however in that it has a recess or notch formed in two adjacent side walls of the pin which extend directionally along the edges of facets 46 and 47. The walls 48 and 49 of the notch are generally parallel with the side walls of the pin, allowing for suitable draft, and join with each other. The pins 44 are positioned in the die matrix to define the sides of the sections.

The fourth type of pin used in the matrix of FIG. 1 is illustrated in FIGS. 8 and 9. This pin 51 is also hexagonal, made of a convenient length, and pointed at one end by three plane perpendicular surfaces or facets 52, 53, and 54. The end of this pin 51 however is formed with a notch in four consecutive sides of the pin which extend directionally parallel to edges of all three facets. As shown, it extends along one edge of the facets 52 and 54 and along two edges of facet 53. The walls of the notch form triangularly shaped wall surfaces as shown in FIG. 8 which are generally parallel to the side wall of the pin, except for the allowance of suitable draft. The pins 51 are used in conjunction with pins 37 to define the adjacent corners of four sections of the die.

Referring again to FIG. 1 it is shown that a number of each of the four types of hexagonal pins are assembled in a manner such that the notches in the pins 37, 44, and 51 are interconnected to form continuous slots across the face of the die, dividing the die into sections with each section having sufficient uninterrupted facets to define between 2 and 12 perfect cube corners, i.e., each cube corner having three complete adjacent sides of a cube.

FIG. 10 illustrates schematically a mold for forming an article having a generally plate-like appearance with a plurality of cube-corner retro-reflecting units and septa on the rear surface thereof. The mold may include a fixed portion 61 having a cavity with an interior planar surface 62 for forming the front side of an article. The surface 62 is joined by generally perpendicular walls 63. An opening 64 is formed in one of the walls 63 and communicates with a conduit 65 through which material may be injected into the mold to form the article.

The movable portion 66 of the mold is adapted to receive the die 30, and mates with the fixed portion 61 to define a spacing between the apexes of the various pins 32, 37, 44, and 51 and the surface 62, defining the article thickness. Conventional injection molding techniques may be used to form the article having the retro-reflecting units, or the same could be formed by pressing. Suitable release pins (not shown) may be positioned in the die 30 to eject the article from the mold. These release pins could extend through an edge of a pin and communicate with a recess.

FIG. 10 also illustrates the cross-section of the die and illustrates that the notches extend slightly below the lowermost corners in the face of the die.

FIG. 11 is a view of an article, generally designated 70, formed by the die 30. This article is formed of transparent material and is plate-like having a uniform thickness with a smooth planar front side and a rear side, which is shown in FIG. 11, formed with retro-reflective units, the apexes of several being designated by the numeral 71. On the rear side are also formed walls or septa 73 which extend continuously along undulating paths around several units 71, and divide the rear surface into cells which preferably contain not less than two nor more than 12 units, and as illustrated, contain four. It will be noted in FIG. 12 that the finished retro-reflective sheet material comprises the plate 70 and a backing sheet 75 bonded together between the free edges of the septa 73 and the surface of the backing sheet 75, and divide the void between the plate 70 and sheet 75 into definite cells, whereby the four uninterrupted totally reflex-reflective cube corners are enclosed within a single cell. The septa 73 extend perpendicularly from the rear surface of the plate and directionally along the dihedral edges of a unit 71 to connect, along the shortest path, the apexes of adjacent units to define the boundary of each cell. The septa 73 extend rearward at least as far as the apexes and terminate in smooth continuous interconnecting free edges which have a width sufficient to afford an adequate sealing surface to which is bonded the sheet 75. In use, light directed toward the surface 72 would be refracted and reflected within the plate 70 to emerge from the plate 70 back toward the source of the light.

Referring now to FIGS. 13 through 18, the second embodiment will be described. FIG. 13 shows a fragmentary view of the face of a die 80, for forming an article according to the present invention, formed by pin having a square cross-section with the ends staggered a distance equal to the thickness of the pins and with the longitudinal axis of the pins disposed on a slant. The face formed by the adjacent sides and end of each p define a plurality of square planar facets affording a array of cube-corner projections and depressions and plurality of intersecting slots or grooves which extend across the die face dividing it into lozenge-shaped sections or cells.

The grooves in the die are formed by the nesting of preformed pins to define a given pattern. The pins forming this die are illustrated in FIGS. 14 through 17. FIG. 14 illustrates the typical pin 81 which is square in cross-section with an accurately cut and surfaced square end 82, perpendicular to the longitudinal axis of the pin. Three pins of this construction disposed in a parallel staggered relationship will define a cube-corner depression suitable for forming upon molding a cube-corner retro-reflecting unit.

The second type of pin 84, illustrated in FIG. 15, is also square in cross-section and is formed with an accurately cut end 85 which is perpendicular to the longitudinal axis of the pin. Adjacent the end 85 and formed generally parallel with respect to two sides of the pin 84 are notches 86 and 87. These notches 86 and 87 extend from a point slightly below a common corner of the pin 84 and surface 85 downwardly along the sides of the pin at an angle of 45° relative to surface 85. The shoulder formed on the side of the pin, defining the bottom of the notches 86 and 87, are not perpendicular with the sides of the pin but are disposed at an angle such that in the assembled position the groove formed in the face of the die by such notches will have a bottom disposed in a plane parallel with that of the apexes of the trihedrons formed by the adjacent sides and end of the pins. This pin is used to form the corners for the sections on the die.

The third pin 90 used in the die of FIG. 13 is shown in FIG. 16. Pin 90 is also square in cross-section and has an end which is perpendicular to the longitudinal axis of the pin. The pin 90 has a notch 92 formed in one side (along the left edge) of the pin which corresponds generally to the notch 87 in pin 84. The notch 87 is disposed at an incline relative to the surface 91 to form, respectively, slots along the top and bottom edges of the cells on the die 80 as viewed in FIG. 13.

The fourth type of pin used in the die 80 is shown in FIG. 17 and is identified by the numeral 95. Pin 95 is square in cross-section and has an end surface 96 perpendicular to the longitudinal axis of the pin and a notch 97 is formed in one side wall (along the forward edge) of the pin adjacent the surface 96 and extending along said side wall at an angle inclined relative to the plane of the end 96 in a manner corresponding to notch 86 on pin 84. This incline is from the left side downwardly from surface 96 to the right side wall. The pin 95 is used to define the right and left edges of a section on the die, thus forming septa on the sides of a cell. The walls defining a side of the notches 86, 87, 92 and 97 are generally parallel to the side walls of the pins but are formed with sufficient draft to permit release of the cube corner article from the face of the die 80.

FIG. 18 shows a single cavity mold having a fixed portion 100 which is formed with a cavity having a flat planar surface 101 connected by perpendicular side walls 102. An injection conduit 103 is disposed in one of the side walls 102, permitting the injection of material into the mold. The movable portion 104 of the mold is formed with a cavity, in which is placed in a predetermined array, a number of pins 81, 84, 90, 95, to define a pattern forming a die 80 having a cube-corner forming face as illustrated in FIG. 13. The pins are disposed on a slant such that the end surfaces and portions of adjacent sides define the cube-corner projections and depressions. The pins positioned as illustrated define several depressions each of which has three complete cube walls. By injecting material into the mold of FIG. 18 in the conventional manner and allowing the same to set, an article 105 (FIG. 19) is formed which has a smooth planar front surface and a rear surface formed with cube-corner retro-reflecting units 106 and septa 111 and 112. The septa 111 and 112 extend directionally along the dihedral edges of facets forming certain of the units 106 and connect adjacent apexes of said units.

Suitable release pins (not shown) must be positioned in the die to eject the molded article from the face of the pins. These release pins may be positioned to engage the septa formed on the rear face of the article 105 and may extend through certain of said pins parallel to the axis thereof.

A rear side view of the article 105 formed by the die of FIG. 13 is illustrated in FIG. 19. The article 105 may have bordering septa 111 corresponding to the angle and direction of dividing septa 112, and the septa 112 are formed with free securable edges having a width sufficient to afford easy bonding thereto of a backing such as the sheet 113, illustrated in FIG. 20. It will be noted that the septa should project from the rear face of the article at least to the imaginary surface generated by the apexes of the cube-corner units 106, and as illustrated in the sectional view (FIG. 20) the septa extend beyond the apexes of the cube-corner retro-reflective units 106. A backing sheet 113 can thus be bonded to the surfaces of the septa to hermetically seal the units 106 in a cell.

A third embodiment of the members for forming a die in accordance with the present invention is illustrated in FIG. 21. This figure of the drawing illustrates a die 120 formed of plate-like elements 121 with one saw-tooth-type edge formed by square surfaces having equal 90° dihedral angles, with the dihedral edges extending transversely of the plates and normal to the sides of the plates. Plates 121 are located to position the surfaces congruously to form trihedral depressions, with the dihedral upper edge of a ridge or tooth 122 aligned with and disposed in the same plane as a groove line on the dihedral edge formed between two teeth. The die face formed will correspond generally to that shown in FIG. 13. Notches 123 may be routed transversely through the plates along edges of the square facets and obliquely to the plane of the plates to form the septa in the molded article. Additionally, material may be removed from sides of the plates adjacent the saw-toothed edge to form recesses 124 running generally parallelly with the edges of the plates, allowing again for draft, as illustrated at 124.

It is desired that the cells in the articles such as 70 and 105 be as small in size as possible but yet the reflectivity of an article must, as a practical matter, be sufficient such that the non-retro-reflective area caused by the septa interferring with the retro-reflectivity of certain units do not constitute an area greater than that defined by retro-reflecting units. Preferably retro-reflectivity of the article results in a measure of at least 400 candle power per foot candle per square foot measured at 0.2° divergence from a beam at −4° incidence to the front face. The cells should be as small as possible and therefore preferably have a retro-reflective area not less than 0.06 square inch (4 square millimeter) or greater than one square inch (6 square centimeters) and should include not less than 2 retro-reflecting units. The septa have a free edge which is at least 1/100 inch (0.2 mm) and preferably not over ⅛ inch (3 mm), and indeed not over ¼ inch (6 mm).

The backing as illustrated in FIGS. 12 and 20 is preferably a material which is essentially vapor impermeable and durable when exposed to the weather. Examples of such materials for the backing are aluminum sheeting, galvanized steel, various laminates and/or durable polymeric film-like sheet materials suitably formed, for example of polymethyl methacrylate, polyestes, polyamides, polyvinyl fluoride or polyvinyl chloride. This backing may be flexible or rigid, but it must be bonded to the free edges of the septa providing a multiplicity of hermetically sealed cells which are each free from contamination by dust particles or moisture to maintain a substantially continuous prism-air interface on the smooth facets of the retro-reflecting units. There is no silvering or other reflective coating on the units. In fact, such coatings only degrade or diminish the retro-reflectivity of the article.

The free edges of the septa may be bonded to the backing by various means such as heat sealing (using a grid next to the backing corresponding to the pattern of the septa); adhesives, either pressure sensitive or heat or solvent activatable adhesives; or by using a solvent which attacks the septa to make the free edge tacky and, preferably, the backing material to thus form a bond. The adhesive may be applied to the face of the backing, to the face edges of the septa or to both. Further, a polymerizable syrup, e.g. methylmethacrylate syrup, could be applied to the backing or septa to bond the articles. It is important, however, to avoid exposure of the facets forming the retro-reflecting units to the solvents, adhesives or excessive heat.

Having thus described the invention, what is claimed is:

1. A retro-reflective monolithic article formed of transparent material and having a front and rear surface, the front surface being smooth and the rear surface having a continuous array of cube-corner retro-reflective units, said array being divided by intersecting septa into a plurality of separate cells, each said cell containing a plurality of said units, and said septa having rear edges forming a continuous securable rear edge, characterized in that said array is formed as a surface of continuous contiguous rearwardly projecting cube-corner units each having a rearwardly positioned apex formed by three rectangular mutually perpendicular rearwardly converging facets forming three rearwardly converging dihedral edges, and said septa are formed as continuous intersecting walls extending rearward from a portion of at least one of said facets forming said dihedral edges, having a width less than a dimension of said facet, and directionally along the shortest path defined by said dihedral edges connecting apexes of adjacent units whereby said septa minimize the loss in retro-reflectivity afforded by said facets from which said septa extend.

2. A retro-reflective article according to claim 1 wherein said front surface is planar and the rear edges of said septa project rearward at least as far as said apexes.

3. A retro-reflective article according to claim 1 wherein said septa have side walls extending generally parallel with the plane of a facet of each of the projecting cube-corner units and extend generally along straight lines dividing said article into lozenge-shaped cells.

4. A retro-reflective article according to claim 1 wherein said septa follow a zig-zag path and have side walls which are generally perpendicular to a plane defined by the rear edges of said septa.

5. A retro-reflective article according to claim 2 wherein said article has a uniform thickness between said front surface and the rear edges of said septa.

6. A monolithic retro-reflector structure for reflecting light back toward the source thereof, said structure comprising a body of transparent material having a substantially smooth light receiving front surface area and a rear surface area immediately opposite and coextensive with said front surface area, said rear surface area having an array of contiguous cube-corner retro-reflective units having rearwardly positioned apexes each formed by three rectangular mutually perpendicular rearwardly converging facets forming three converging dihedral edges, said array of cube-corner retro-reflective units being continuous and divided by intersecting septa, said intersecting septa defining a substantially continuous rear support surface and dividing said rear surface area into a plurality of separate isolated cells each containing a plurality of said retro-reflective units oriented in the cells to reflect light falling upon said front surface area, said units reflecting from said structure light falling upon said front surface area in the portion thereof corresponding to said cells and reflecting the light back toward the source thereof to render said structure highly visible at night, and said septa extending rearwardly from a portion of at least one of the facets defining the converging dihedral edges of said cube-corner retro-reflective units and along the dihedral edges of adjacent units forming the shortest path between the apexes of said adjacent units along the edges of said cells.

7. A retro-reflective sheet material comprising
a monolithic article formed of transparent material having a smooth light-receiving front surface and a rear surface opposite said front surface and coextensive with said front surface, said rear surface having a continuous array of cube-corner retro-reflective units having apexes each formed by three rectangular mutually perpendicular rearwardly converging facets forming three converging dihedral edges and having intersecting septa, said septa extending rearwardly from a portion of at least one facet forming said dihedral edges adjacent said edge, and directionally along said dihedral edges joining the apexes of adjacent units for dividing said rear surface into a plurality of separate cells each containing a plurality of said units, said septa having rear edges positioned rearwardly a distance at least equal to that of the apexes of said units, and
a backing joined to said rear edges of said septa to define hermetically sealed cells in said material.

* * * * *